United States Patent Office 3,575,910
Patented Apr. 20, 1971

3,575,910
SILOXANE-ACRYLATE COPOLYMERS AND EMULSIONS THEREOF
Robert N. Thomas, Midland, Mich., assignor to Dow Corning Corporation, Midland, Mich.
No Drawing. Continuation of application Ser. No. 554,984, June 3, 1966, which is a continuation-in-part of application Ser. No. 482,591, Aug. 25, 1965. This application July 1, 1968, Ser. No. 741,246
Int. Cl. C08f 45/24, 35/02, 11/04
U.S. Cl. 260—29.6                                     12 Claims

ABSTRACT OF THE DISCLOSURE

Silicone-acrylate copolymers, aqueous emulsions of these copolymers, latex paints containing the copolymers and articles of manufacture having a coating containing the copolymers are disclosed. The copolymers, particularly as aqueous emulsions, are useful in preparing latex coatings.

---

This application is a continuation of application Ser. No. 554,984 filed June 3, 1966, which is a continuation-in-part of application Ser. No. 482,591 filed Aug. 25, 1965, both now abandoned.

This invention is directed to siloxane-acrylate copolymers and to aqueous emulsions thereof. This invention is also directed to coating compositions, particularly latex paints, which contain a copolymer of this invention. The invention is further directed to an article of manufacture which is a construction material having a coating which contains a copolymer of this invention.

More specifically, this invention relates to a copolymer which consists essentially of 25 to 90 percent by weight of an acrylate containing from 1 to 8 carbon atoms in the ester portion and 10 to 75 percent by weight of a siloxane consisting essentially of 45 to 65 mol percent $R_2SiO$ units and 35 to 55 mol percent $RSiO_{3/2}$ units wherein each R is selected from the group consitsing of hydrocarbon and substituted hydrocarbon radicals.

This invention also relates to aqueous emulsions of the above defined copolymers, and to coating compositions containing such materials. The invention also relates to articles of manufacture having a coating which contains the copolymers.

It is an object of this invention to provide new siloxane-acrylate copolymers and emulsions thereof. Another object is to provide coating compositions, including varnishes, latex paints and roofing compositions which contain the soloxane-acrylate copolymers of this invention. These compositions can be applied, for example, to metals, plastics, wood, paper, composition boards and other cellulosic materials. It is especially an object of this invention to provide coating compositions which provide greatly improved weathering characteristics and find special utility in industrial applications. Still another object is to provide sealant compositions containing the copolymers of this invention. Further objects include the provision of molding compositions and adhesive compositions which contain the copolymers of this invention. Other objects and the advantages of this invention will be obvious to those skilled in the art in light of the following detailed description.

Any organic acrylate can be employed in making the copolymers of this invention. Thus, for example, acrylic acid and methacrylic acid or their derivatives such as the esters, nitriles and amides can be employed. The esters are the preferred compounds. Specific examples of acrylates that can be employed are methacrylate, ethylacrylate, butylacrylate, amylacrylate, 2-ethylhexylacrylate, cyclohexylacrylate, vinylacrylate, allylacrylate, β-methallylacrylate, methyl-α-chloroacrylate, ethyl - α - bromoacrylate, propyl-α-chloroacrylate, benzylacrylate, parachlorobenzylacrylate, tetrahydrofurfurylacrylate, hydroxyethylacrylate, hydroxypropylmethacrylate, hydroxyethylmethacrylate, hydroxypropylacrylate, ethyl-α-hydroxymethylacrylate, ethylcyanoacrylate, trifluoroethylacrylate, perfluoroethylacrylate, perfluorobutylacrylate, ethylene glycol diacrylate, glyceryl triacrylate, methyl methacrylate, ethyl methacrylate, butyl methacrylate, hexyl methacrylate, allyl methacrylate, benzyl methacrylate, diethylene glycol dimethacrylate, methyl ethacrylate and methyl butacrylate. It is understood by those skilled in the art that either a single acrylate or various combinations of acrylates can be employed in making the copolymer. The particular choice of acrylate(s) will be determined by the intended use of copolymer. Thus, for example, methyl methacrylate by itself tends to give a hard and somewhat brittle product which can be used in making automobile finishes, whereas ethyl acrylate by itself tends to give a soft and somewhat sticky product which would not be useful as an automobile finish but instead would find utility in another field such as treating textiles or making adhesives. Where properties somewhere in between are desired one can use a blend of methyl methacrylate and ethyl acrylate and obtain a product which has the right degree of hardness (or softness) and amount of flexibility necessary for use in coatings for wood. Generally speaking, it is preferred to employ a blend of acrylates in making the copolymers since it is seldom possible to find a single compound which will give a product having the optimum properties desired for a particular application.

The siloxane used to make the copolymer is one composed of 45 to 65 mol percent $R_2SiO$ units and 35 to 55 mol percent $RSiO_{3/2}$ units. The R radicals in the siloxane units can be either hydrocarbon or substituted hydrocarbon radicals. Thus R can be, for example, an alkyl, alkenyl, alkynyl, cycloalkyl, cycloalkenyl, aryl, alkaryl or an aralkyl radical; the halogen and cyano derivatives of the foregoing hydrocarbon radicals; or hydrocarbon radicals containing ether, thioether, ester or thioester linkages. Of course, no group which has a substituent which would interfere with the subsequent preparation of the copolymers should be employed. Specific examples of the R radicals are the methyl, ethyl, propyl, butyl, amyl, dodecyl, octadecyl, myricyl, vinyl, allyl, hexenyl, ethynyl, propargyl, cyclobutyl, cyclohexyl, cyclohexenyl, phenyl, naphthyl, xenyl, tolyl, xylyl, mesityl, t-butylphenyl, benzyl, 2-phenylethyl, 2-phenylpropyl, 3-chloropropyl, 3,3,3-trifluoropropyl, chlorocyclohexyl, bromophenyl, dichlorophenyl, α,α,α-trifluorotolyl, mercaptoethyl, mercaptopropyl, mercaptododecyl, cyanoethyl, cyanopropyl, hydroxypropyl,

—$(CH_2)_3OOCCH=CH_2$, —$(CH_2)_3OOCC(CH_3)=CH_2$,

—$(CH_2)_3OCH_3$, —$(CH_2)_3OC_2H_5$, —$(CH_2)_3COOC_2H_5$

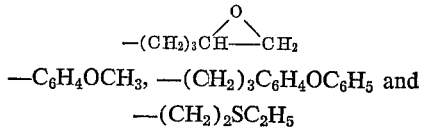

—$C_6H_4OCH_3$, —$(CH_2)_3C_6H_4OC_6H_5$ and

—$(CH_2)_2SC_2H_5$

It is preferred that the R radicals contain less than 10 carbon atoms, and the methyl, ethyl, vinyl, phenyl and 3,3,3-trifluoropropyl radicals are the most preferred at this time.

One preferred type of copolymer is that prepared by vinyl copolymerization. In this type of copolymer it is essential that some of the R radicals are vinylic radicals. By "vinylic" radicals it is meant that they contain the structure $CH_2=C<$ as a part of the radical. Examples of such groups are included above. The number of R radicals that are vinylic radicals must be such that the ratio of vinylic radicals to silicon atoms in the siloxane is in the range of 0.02–0.1:1. Generally speaking, the more vinylic groups present in the siloxane the less flexible the product and vice versa. The ratio of vinylic radicals to silicon atoms employed in the copolymer is, of course, determined by the characteristics desired in the product.

Another preferred type of copolymer is one prepared employing a siloxane containing silicon bonded hydroxyl and/or alkoxyl groups (for example methoxyl, ethoxyl, propoxyl or butoxyl groups) and an acrylate containing pendant hydroxyalkyl groups. The siloxane must contain at least 0.5 percent by weight, preferably at least 2 percent, of the hydroxyl and/or alkoxyl groups. Generally speaking, the greater the percentage of such groups present in the siloxane the less flexible the product and vice versa. The exact percentage of hydroxyl and/or alkoxyl groups in the siloxane employed is, of course, determined by the characteristics desired in the copolymer. The acrylate used in making this type of copolymer must contain from 1 to 20 mol percent of a hydroxyalkylacrylate. Of those available, 2-hydroxyethylmethacrylate, and 2-hydroxypropylmethacrylate are preferred. If the copolymer is to be made by emulsion polymerization, it is preferred that the amount of hydroxyalkylacrylate be in the range of 1 to 10 mol percent.

Still another way of preparing the copolymers of this invention is by the copolymerization of a siloxane containing mercaptoalkyl substituents and an acrylate. Other methods of preparing the siloxane-acrylate copolymers will be apparent to those skilled in the art.

Referring back now to the relative amounts of the $R_2SiO$ and $RSiO_{3/2}$ units in the siloxane, the exact proportions employed will again be determined by the properties desired in the copolymer. As a guide to the amounts to be used, the following considerations are offered. As the amount of $R_2SiO$ units is increased, the resulting acrylate-siloxane copolymers will be softer, stickier and exhibit higher dirt pickup. As the amount of $RSiO_{3/2}$ units is increased, the resulting acrylate-siloxane copolymer will be harder, drier and more brittle. By using the proper proportions of the two siloxane units one can impart the desired properties to the copolymer. It should be understood that the siloxane can also contain small amounts of $R_3SiO_{1/2}$ and $SiO_2$ units so long as their presence does not have a deleterious effect on the final copolymer.

The copolymer must contain from 25 to 90 percent by weight of an acrylate and from 10 to 75 percent by weight of the siloxane. Preferably the percents of acrylate and siloxane, respectively, are in the range of 60 to 80 and 20 to 40. Here again, the exact proportions used will depend on the properties required in the copolymer for its intended use.

So far as is known at this time, the best method for preparing the copolymers of this invention is as follows. The siloxane is first prepared by emulsion polymerization, preferably starting with the appropriate alkoxysilanes. Then a free radical catalyst is added to the resulting siloxane emulsion and then the acrylate monomer(s) are added thereto and the siloxane and acrylate copolymerized, preferably under acidic conditions. The best method, as it relates to the specific preferred copolymers, will be illustrated in detail in the examples.

Any catalyst can be employed which promotes the copolymerization of the siloxane and acrylate. The preferred compounds are the free-radical generating catalysts and catalyst systems. Specific examples of such catalysts include: the inorganic peroxides such as hydrogen peroxide, ammonium persulfate, potassium persulfate and the like; the various organic peroxy catalysts, such as the dialkyl peroxides, e.g. diethyl peroxide, diisopropyl peroxide, dilauryl peroxide, dioleyl peroxide, distearyl peroxide, di-(tertiary - butyl)peroxide, di - (tertiary amyl)peroxide, dicumyl peroxide and the like; the alkyl hydrogen peroxides such as tertiary butyl hydroperoxide, tertiary amyl hydroperoxide, cumene hydroperoxide, tetralin hydroperoxide, the diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxides such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis(isobutyronitrile), 2-azobis(2-methylbutyronitrile), 1-azobis(1-cyclohexanecarbonitrile) and the like and other free radical generating catalysts such as the disulfides are useful herein.

The above description of the preparation of the copolymer outlines the essential steps in the process, while detailed descriptions of the preferred embodiments are set forth in the examples below.

In order that those skilled in the art may better understand how the present invention can be practiced, the following examples are given by way of illustration and not by way of limitation. All percents are by weight unless otherwise specified.

EXAMPLE 1

254.4 g. of distilled water, 6 g. of sodium dodecylbenzene sulfonate and 4 g. of reagent grade (28%) ammonium hydroxide were placed in a 500 ml. beaker and heated to 65° C. while agitating with an electric stirrer. Then a mixture of 10 g. of vinyltrimethoxysilane, 90.4 g. of phenylmethyldimethoxysilane and 50 g. of phenyltrimethoxysilane was added to the beaker via a dropping funnel over 10 minutes. After the silane addition was complete, agitation and heating was continued for another 10 minutes. 300 g. of the resulting opalescent emulsion was heated to boiling (86°–90° C.) and about 70 ml. of volatiles distilled off (primarily methanol and ammonia) leaving a siloxane emulsion having about 30% solids and a pH in the range of 7.5 to 8.0.

190 g. of the agove siloxane emulsion, 6.4 g. of an anionic surfactant solution (36% solids) and a mixture of 34 g. of distilled water and 0.95 g. of acrylic acid were placed in a beaker and the pH adjusted to 5.0 by adding 3 g. of a 7% sodium bicarbonate solution. This mixture was placed in a three-necked flask, purged with nitrogen, heated to 85° C., then 10% of a mixture of 79.8 g. of ethylacrylate and 53.2 g. of methylmethacrylate was added, and next 25% of a solution of 34.7 g. of distilled water and 0.76 g. of potassium persulfate was added. Over the next 45 minutes, the balance of the acrylate and persulfate solution was added, the balance of the persulfate being added in three (25%) increments when 25, 50 and 75% of the remaining acrylate had been added. Of course, the reaction temperature was maintained at 85° C. and the nitrogen purge and agitation were maintained throughout the whole time. After the reaction was complete, the emulsion of the siloxane-acrylate copolymer was cooled, the pH adjusted to 8.6 with ammonium hydroxide, and 20 g. of distilled water added to adjust the viscosity to 262 cps.

A film of the copolymer was cast from the above emulsion onto a metal panel. Wetting of the panel by the emulsion was excellent and the resulting copolymer film completely clear. The film had a pencil hardness of B and a flexibility of OT radius.

EXAMPLE 2

224.8 g. of water, 4 g. of ammonium hydroxide, 3 g. of an adduct of nonylphenol with nine mols of ethylene oxide and 8.3 g. of an anionic surfactant were mixed in a 600 ml. beaker and heated to 60° C. Then a mixture of 25.8 g. of vinyltrimethoxysilane, 86.3 g. of phenyltrimethoxysilane, 20.6 g. of diphenyldimethoxysilane and 59.2 g. of dimethyldimethoxysilane was added to the mixture over a period of several minutes, the agitation and heating being continued for about 10 minutes after the addition was complete. At this point about 100 g. of volatiles was distilled off.

133 g. of the above siloxane emulsion was mixed with 39.8 g. of water, 0.77 g. of acrylic acid and 1.3 g. of sodium lauryl sulfate, and then the pH adjusted to 5.0 by adding 1.3 g. of 7% sodium bicarbonate solution. The resulting mixture was placed in a three-necked flask, purged with nitrogen, heated to 85° C. and then 10% of a mixture of 81 g. of ethyl acrylate and 27 g. methyl methacrylate was added followed by the addition of 25% of a solution of 28.2 g. of water and 0.62 g. of potassium persulfate. The remainder of the acrylate mixture and the persulfate solution was added over a period of about 60 minutes in a manner similar to that employed in the previous example. The resulting product was an emulsion of the siloxane-acrylate copolymer.

EXAMPLE 3

A mixture of 677.6 g. of distilled water, 11 g. of ammonium hydroxide, 14 g. of an adduct of nonylphenol with nine mols of ethylene oxide and 40.2 g. of an anionic surfactant were placed in a beaker and heated to 60° C. Then a mixture of 41.8 g. of methyltrimethoxysilane, 214 g. of phenyltrimethoxysilane, 51 g. of diphenyldimethoxysilane, 148 g. of dimethyldimethoxysilane and 22.5 g. of vinyltrimethoxysilane was added with constant stirring over a period of 10 minutes. After the addition was complete the mixing was held at 60° C. with agitation for about 30 minutes, and then 280 ml. of volatiles were distilled off.

154 g. of the above siloxane emulsion was mixed with 1.27 g. of acrylic acid, 3,24 g. of sodium dodecylbenzene sulfonate and 80.77 g. of water and the pH of the resulting mixture adjusted to 5 by adding about 4 g. of a 7% sodium bicarbonate solution. To this was added a mixture of 75.5 g. of ethyl acrylate and 50.5 g. of methylmethacrylate and a solution of 30 g. of water and 0.72 g. of potassium persulfate, these mixtures being added as in the previous examples with the reaction being complete after about one hour. The product was an emulsion of the siloxane-acrylate copolymer. The copolymer was thermoplastic when hot. A film of the copolymer was cast on a metal panel and cured for 15 minutes at 150° C. It had a pencil hardness of HB and a flexibility of OT radius. Another film of the copolymer which had been cured for 15 minutes at 205° C. had a pencil hardness of 3H and a flexibility of OT.

EXAMPLE 4

To 154 g. of an aqueous emulsion of a siloxane copolymer composed of 5.2 mol percent monovinylsiloxane units, 62.8 mol percent phenylmethylsiloxane units and 32 mol percent monophenylsiloxane units, there being about 35% siloxane solids in the emulsion, there was added 1.27 g. of acrylic acid, 3.24 g. of sodium lauryl sulfate, 80.77 g. of water, and then the pH adjusted to 5 by adding about 5 g. of a 7% sodium bicarbonate solution. The resulting mixture was heated to 85° C. and then there was added a mixture of 75 g. of ethyl acrylate and 50 g. of methyl methacrylate, and a solution of 30 g. of water and 0.5 g. of potassium persulfate, these mixtures being added as in the previous examples with the reaction being complete in about one hour.

A film of the siloxane-acrylate copolymer was cast on a metal panel from the emulsion of the copolymer prepared above. Wetting of the panel by the emulsion was excellent and the resulting film was transparent. The film was cured for 5 minutes at 175° C. It had a pencil hardness of B and a flexibility of OT radius.

A pigment dispersion was made by mixing 100 g. of water, 31.6 g. of an anionic surfactant, 815 g. of titanium dioxide, 136 g. of mica, 454 g. of calcium carbonate, 204 g. of aluminum silicate, 68 g. of ethylene glycol, 9.1 g. of 1200 molecular weight polyethylene glycol and 18.1 g. of 4000 cps. methyl cellulose, the latter three ingredients having been premixed. This mixture was then tinted to the desired shade of green with yellow iron oxide and phthalo green. 100 g. of this pigment dispersion was thoroughly mixed with 100 g. of the emulsion of the siloxane-acrylate copolymer prepared above and the resulting latex paint coated on a metal panel and then cured for 5 minutes at 175° C. The paint had excellent wetting and the cured film had a pencil hardness of B and a flexibility of OT radius.

EXAMPLE 5

To 134 g. of an aqueous emulsion of a siloxane copolymer composed of 10 mol percent monomethylsiloxane units, 35 mol percent monophenylsiloxane units, 5 mol percent monovinylsiloxane units, 10 mol percent diphenylsiloxane units and 40 mol. percent dimethylsiloxane units, there being about 40% siloxane solids in the emulsion, there was added a mixture of 93 g. of water, 1.27 g. of acrylic acid and 9.3 g. of an anionic surfactant. The pH of the mixture was adjusted to 5 by the addition of 7% sodium bicarbonate solution and then heated to 83° C. Then a mixture of 75.5 g. of ethyl acrylate, 44 g. of methyl methacrylate and 6.3 g. of hydroxypropyl methacrylate and a solution of 30 g. of water and 0.5 g. of potassium persulfate were added as in the previous examples with the reaction being complete in about 45 minutes. The resulting emulsion contained about 46% siloxane-acrylate copolymer solids and had a viscosity of 150 cps. A film of the copolymer was cast on a metal panel and cured. It had a pencil hardness of HB and a flexibility of OT radius.

A good latex paint was prepared by mixing 100 g. of the above prepared siloxane-acrylate copolymer emulsion and 100 g. of the pigment dispersion of Example 4.

EXAMPLE 6

To 1350 g. of the siloxane emulsion of Example 5 there was added 970 g. of water, 10 g. of acrylic acid and 31.5 g. of an anionic surfactant. The mixture was heated to about 85° C. and next a mixture of 755 g. of ethyl acrylate, 480 g. of methyl methacrylate, 25 g. of hydroxypropyl methacrylate and 26.7 g. of acrylic acid was added along with a solution of 300 g. of water and 5 g. of potassium persulfate, these mixtures being added as in the previous examples. The reaction was complete in about one hour. The emulsion was cooled to room temperature and 40 g. of ammonium hydroxide added. The siloxane-acrylate copolymer emulsion had a viscosity of 1000 cps.

EXAMPLE 7

To 1350 g. of a 40% siloxane solids aqueous emulsion of a siloxane composed of 13 mol percent monomethylsiloxane units, 35 mol percent of monophenylsiloxane units, 2 mol percent of $CH_2=C(CH_3)COO(CH_2)_3SiO_{3/2}$ units, 10 mol percent diphenylsiloxane units and 40 mol percent dimethylsiloxane units there was added 970 g. of water, 10 g. of acrylic acid, 31.5 g. of an anionic surfactant and then about 40 g. of 7% sodium bicarbonate solution to adjust the pH between 5 and 6. The mixture was then heated to 85° C. and a mixture of 755 g. of ethylacrylate, 505 g. of methylmethacrylate and 15.7 g. of acrylic acid, as well as a solution of 260 g. of water and 5 g. of potassium persulfate was added as in the previous examples. The reaction was complete in about one hour. The siloxane-acrylate copolymer emulsion was cooled to room temperature and then 40 g. of ammonium hydroxide added.

EXAMPLE 8

When paints are made of any of the copolymers of the preceding examples, as was done in Example 5, and the paint applied to aluminum siding, plastic panels, wood siding or 4' x 8' x ¼" plywood panels, prefinished products are obtained which are useful in outdoor and indoor housing construction.

EXAMPLE 9

When 100 g. of an aqueous emulsion of a siloxane composed of 40 mol percent dimethylsiloxane units, 5 mol percent phenylmethylsiloxane units, 5 mol percent tolylmethylsiloxane units, 15 mol percent monomethylsiloxane units, 30 mol percent monovinylsiloxane units and 5 mol percent $C_2H_5SCH_2CH_2SiO_{3/2}$ units, there being about 10% siloxane solids in the emulsion, is mixed and reacted with 10 g. of vinyl acrylate, 80 g. of ethyl methacrylate and 3.5 g. of t-butylhydroperoxide, employing the procedure of the preceding examples, an emulsion of the siloxane-acrylate copolymer is obtained.

EXAMPLE 10

When 165 g. of an aqueous emulsion of a siloxane composed of 40 mol percent dimethylsiloxane units, 10 mol percent 3,3,3-trifluoropropylmethylsiloxane units, 5 mol percent monovinylsiloxane units, 10 mol percent monophenylsiloxane units, 10 mol percent 3,3,3-trifluoropropylsiloxane units and 25 mol percent monomethylsiloxane units were replaced by $CH_2=CHSiO_{3/2}$ units. This emulsion, is mixed and reacted with 200 g. of methylmethacrylate, 135 g. of perfluoroethyl acrylate and 2 g. of ammonium persulfate, employing the procedure of the preceding examples, an emulsion of the siloxane-acryltae copolymer is obtained.

EXAMPLE 11

An emulsion of a silicone-acrylic copolymer was made as in Example 7 except that in the siloxane the

units were replaced by $CH=CHSiO_{3/2}$ units. This emulsion was used to adhere two strips of cardboard which were lapped about ½ inch. After the adhesive had set for various lengths of time, the cardboard strips were pulled at 180° to each other to determine the force required to break the bond between them. The results are reported in the table below, the figures being the pounds per square inch of force required to break the bond. For purposes of comparison, an identical test was run using a commercially available white glue (Craftsman), the results of this test also being reported below. The results show that the above silicone-acrylic copolymer is a good adhesive.

| Time (minutes) | White glue | Silicone-acrylic |
|---|---|---|
| 3 | 66 | 58 |
| 4 | 60 | 60 |
| 5 | 96 | 94 |
| 10 | 69 | 68 |
| 15 | 116 | 100 |
| 20 | 120 | 116 |
| 30 | 139 | 176 |
| 60 | 152 | 136 |

EXAMPLE 12

The silicone-acrylic copolymer emulsion of Example 6 was taken and diluted to 10% copolymer solids with water. These emulsions were then applied to bleached kraft paper. Some of the paper was air dried while some was dried for two minutes at 250° F. For purposes of comparison some of the paper was left untreated. Then one inch strips of adhesive tape were applied to the papers, each strip of tape being rolled five times with a four and one-half pound roller after being applied. The papers were placed in a Keil tester and the tape pulled back over itself at a 180° angle to determine the force required to release the tape from the paper. The results are reported in the table below, the figures being in grams per inch. The results show that these emugisions can be used as release coatings.

| Silicone-acrylic copolymer | Air dried | Dried 2′ at 250° F. |
|---|---|---|
| Example 6 | 510 | 402 |
| None (control) | 796 | 796 |

EXAMPLE 13

Four mixtures were prepared which contained the following ingredients:

(A) 72 g. of dimethyldimethoxysilane, 79 g. of phenyltrimethoxysilane, 134.5 g. of ethylacrylate, 78.3 g. of methylmethacrylate, 11.2 g. of 2-hydroxyethylmethacrylate and 2 g. of acrylic acid.

(B) 258 g. of water, 22 g. of an anionic surfactant, 2.48 g. of acrylic acid and 5 g. of a 7% aqueous sodium bicarbonate solution to adjust the pH of this mixture to about 4.

(C) 25 g. of water and 1 g. of potassium persulfate.

(D) 4 g. of ammonium hydroxide.

Solution (B) was placed in a three-necked flask, heated to 80° C. under nitrogen purge, and then 25% of (C) added. Then (A) was fed into the mixture, with agitation, over a period of about 2 hours with the balance of (C) being added in three increments after proportionate amounts of (A) had been added. After the reaction was complete, (D) was added to neutralize the emulsion. The resulting product was an excellent emulsion containing about 38.3% of the siloxaneacrylate copolymer.

EXAMPLE 14

Four mixtures were prepared which contained the following ingredients:

(A) 302.3 g. of ethylacrylate, 176.5 g. of methylmethacrylate, 25.2 g. of 2-hydroxyethylmethacrylate and 7.55 g. of acrylic acid.

(B) 616 g. of an aqueous emulsion containing 35% of an emulsion polymerized siloxane copolymer composed of 60 mol percent $(CH_3)_2SiO$ units and 40 mol percent $C_6H_5SiO_{3/2}$ units and containing at least 0.5% hydroxyl and/or methoxyl groups, 9.36 g. of an anionic surfactant, 310.32 g. of distilled water, 10 g. of a 7% aqueous sodium bicarbonate solution and 15 drops of sulfuric acid, the pH of this mixture being about 5.5.

(C) 100 g. of water and 2 g. of potassium persulfate.

(D) 16 g. of ammonium hydroxide.

Solution (B) was placed in a three-necked flask, heated to about 85° C. under nitrogen purge, and then 25% of (C) added. Then (A) was fed into the mixture, with agitation, over a period of about 2 hours with the balance of (C) being added in three increments after proportionate amounts of (A) had been added. After the reaction was complete, (D) was added to neutralize the emulsion. The resulting product was an excellent emulsion containing about 46% of the silicone-acrylate copolymer.

EXAMPLE 15

When 485 g. of an aqueous emulsion of a siloxane composed of 40 mol percent dimethylsiloxane units, 10 mol percent 3,3,3-trifluoropropylmethylsiloxane units, 10 mol percent monophenylsiloxane units, 10 mol percent 3,3,3-trifluoropropylsiloxane units and 30 mol percent monomethylsiloxane units, there being about 30% siloxane solids (containing about 5% hydroxyl groups) in the emulsion, is adjusted to a pH of about 4 with sulfuric acid and then is mixed and reacted with 200 g. of methylmethacrylate, 100 g. of perfluoroethylacrylate, 35 g. of hydroxypropylacrylate and 2 g. of ammonium persulfate, employing the procedure of the two preceding examples, an emulsion of the siloxane-acrylate copolymer is obtained.

EXAMPLE 16

When there is charged into a ball mill 31.25 g. of aluminum silicate, 57 g. of calcium carbonate, 17.25 g. of mica (325 mesh), 1.25 g. of phthalocyanine green, 4.1 g. of yellow iron oxide, 47 g. of rutile titanium dioxide, 6.25 g. of an anionic surfactant and 350 g. of one of the silicone-acrylate copolymer emulsions of Examples 13–15 containing about 30–40% copolymer solids, and then there is added thereto a mixture containing 3.75 g. of di(phenylmercuric)dodecenyl succinate, 5 g. of ethylene glycol, 3.2 g. of an organic defoamer and 0.85 g. of a silicone defoamer, and then the ingredients ball milled for 16 hours, latex paints having good hardness and flexibility characteristics are obtained.

When the above paints are applied to metals, aluminum siding or used as coil coatings, and cured for about 15 minutes at 400° F., excellent coatings are obtained.

When the above paints are mixed with 12.4 g. of a 50% aqueous solution of hexamethoxy methylmelamine and 0.85 g. of a 50% aqueous solution of ammonium toluene sulfonate, coating compositions are obtained which are good for prefinishing wood siding and other construction materials which require a low curing temperature. These compositions can be cured in about 5 minutes at 300° F.

EXAMPLE 17

To 308 g. of an aqueous emulsion (under a nitrogen purge) containing about 36% siloxane solids comprising about 60 mol percent $(CH_3)_2SiO$ units and about 40 mol percent $C_6H_5SiO_{3/2}$ units there was added enough straight chain dodecylbenzene sulfonic acid to adjust the pH to about 2. Then 0.2563 g. of $HSCH_2CH_2CH_2Si(OCH_3)_3$ was added and the mixture allowed to equilibrate for four hours.

To the 308.2563 g. of above siloxane emulsion, now containing $HSCH_2CH_2CH_2SiO_{3/2}$ units also, there was added 4.68 g. of a nonionic surfactant and 154.72 g. of deionized water. This diluted emulsion was then mixed with 151 g. of ethylacrylate, 88.4 g. of methylmethacrylate, 2.52 g. of methacrylic acid and 1.26 g. of acrylic acid. The resulting emulsion was placed in an addition funnel attached to a three-necked flask containing 50 g. of deionized water and 1 g. of potassium persulfate. About 20% of the emulsion was added to the flask and then the flask contents heated to 70° C. (under a nitrogen purge) and held there during the addition of the remainder of the above prepared emulsion with agitation, which took about one hour. After the addition was complete, the flask contents were heated and agitated at 90° C. for another 30 minutes and then neutralized to a pH of about 9.5 with ammonium hydroxide.

Two latex paints were prepared, one by pigmenting a commercial acrylate latex emulsion (Rohm and Haas AC–34), and the other by pigmenting the above prepared silicone-acrylate emulsion. The only difference between the two paints was the polymer present. Two coats of these paints were applied to cedar panels, each coat allowed to dry, and then the panels placed in an Atlas Sunshine Weatherometer containing an unfiltered carbon arc. After various periods of time the panels were evaluated for gloss retention (60° Gardner gloss), and evaluated visually for chalking and fading according to the following scales:

Chalking
10: no failure
9–8: trace
7–6: slight
5–3: moderate
2–0: severe

Fading
10: no failure
9: trace
8–6: slight
5–3: moderate
2–0: severe

The Weatherometer test results are set forth in the following table.

| Copolymer | 60° gloss (hours) | | | Chalking (hours) | | Fading (hours) | |
|---|---|---|---|---|---|---|---|
| | Initial | 100 | 300 | 100 | 300 | 100 | 30. |
| Commerical* | 4 | 2 | 1 | 5 | 4 | 4 | 3 |
| Silicone-acrylate | 3 | 4 | 4 | 9.5 | 9.5 | 6 | 6 |

* Included for purposes of comparison.

EXAMPLE 18

An aqueous emulsion of a copolymer was prepared which consisted of 70% acrylate and 30% siloxane. The acrylate portion was composed of 60% ethyl acrylate, 35% methyl acrylate and 5% hydroxyethyl methacrylate. The siloxane portion was composed of 65 mol percent dimethylsiloxane units, 33 mol percent monophenylsiloxane units and 2 mol percent monovinylsiloxane units. The copolymer was prepared by emulsion polymerization.

A second aqueous emulsion of a copolymer was prepared as above for purposes of comparison. This copolymer was identical except that the siloxane portion was composed of 67 mol percent dimethylsiloxane units and 33 mol percent phenylvinylsiloxane units.

To each of the emulsions which contained about 46% copolymer solids there was added 5% of hexamethoxy methylmelamine (Cymel 301), based on the weight of copolymer solids in the emulsion, as a crosslinking agent. These emulsions were evaluated as clear coatings by making 6 mil wet drawdowns on 3" x 9" aluminum panels.

White pigmented coatings were prepared using the above emulsions in the paint formulation set forth below and then evaluated by making 8 mil wet drawdowns on 3" x 9", aluminum panels. These coatings consisted essentially of 50 g. of the emulsion and about 25 g. of a pigment grind which consisted essentially of 51.6 lbs. of water, 64.5 lbs. of 2% hydroxyethyl cellulose (Cellosize WP–4400), 8.1 lbs. of the sodium salt of carboxylated polyelectrolyte anionic surfactant (Tamol 731), 1.3 lbs. of an aryl alkyl ether nonionic surfactant (Triton CF–10), 3.2 lbs. of an alkyl polyoxyalkylene defoamer (Nopco NXZ), 1.6 lbs. of phenyl mercury propionate mildewcide (Metasol), 99.4 lbs. of titanium dioxide (Titanox RANC), 111 lbs. of calcium carbonate (Duramite) and 111 lbs. of aluminum silicate (ASP–400).

Both the pigmented and unpigmented coatings were baked 15 minutes at 300° F. (149° C.). One or more of the following properties were evaluated on these coatings.

Wetting: Visual evaluation of how well the coating flowed out over the substrate and covered the substrated surface.

Compatibility: Visual evaluation of film clarity indicating whether the siloxane and acrylate portions are mutually soluble.

Dirt Pick-up: An accelerated test where the panels are taped to the outside of an empty sealed quart can with masking tape covering the top and bottom edge leaving the middle exposed. The quart can is then placed in a gallon can containing a solution of 1 g. of carbon black in 500 g. of tap water, the gallon can sealed with a lid, and then rolled for 2 hours on a common paint roller. After rolling, the panels are washed under tap water with the aid of a wet cheesecloth but applying no pressure other than the weight of the cloth. This removes any excess carbon black. The panels are visually evaluated after drying on the following scale:

10: no change
9–7: slight
6–4: moderate
3–0: severe

Adhesion: Standard "Cross-cut Adhesion Test" as described in the Paint Testing Manual, Physical And Chemical Examination, Paints, Varnishes, Lacquers And Colors by Gardner and Sward, Twelfth Edition, March, 1962, page 160. This test consists of making a series of parallel cuts through the film in one direction and a second series at right angles to the first. The cuts are preferably about 1/32 inch apart. Scotch tape is placed over the cross-cut area and then removed, the number of squares remaining intact giving a measure of the adhesion of the film.

Flexibility: The panels are bent over a 1/4 inch mandrel and examined for film breaks.

The unpigmented film from the first copolymer wet the panel well, was clear indicating the acrylate and siloxane portions of the copolymer to be compatible, and showed no dirt pick-up. The unpigmented film from the second copolymer wet the panel poorly, was hazy indicating the acrylate and siloxane portions of the copolymer to be incompatible, and showed no dirt pick-up.

The pigmented film from the first copolymer showed only a trace of dirt pick-up, passed the flexibility test and had 100% adhesion in the adhesion test. The pigmented film from the second copolymer showed only a trace of dirt pick-up, failed the flexibility test and had only 50% adhesion in the adhesion test.

That which is claimed is:

1. A copolymer consisting essentially of 25 to 90 percent by weight of an acrylate containing from 1 to 8 carbon atoms in the ester portion and 10 to 75 percent by weight of a siloxane consisting essentially of 45 to 65 mol percent $R_2SiO$ units and 35 to 55 mol percent $RSiO_{3/2}$ units wherein R is selected from the group consisting of hydrocarbon and substituted hydrocarbon radicals, at least one of the R radicals being a vinylic radical, and the ratio of the vinylic radicals to silicon atoms in the siloxane being in the range of 0.02–0.1:1.

2. A copolymer as defined in claim 1 which consists essentially of 60 to 80 percent by weight of an acrylate selected from the group consisting of esters of acrylic acid and esters of methacrylic acid, and 20 to 40 percent by weight of the siloxane wherein R is selected from the group consisting of the methyl, ethyl, vinyl, phenyl and 3,3,3-trifluoropropyl radicals.

3. A copolymer as defined in claim 1 which consists essentially of 60 to 80 percent by weight of an acrylate consisting essentially of 80 to 99 mol percent of the hydrocarbon esters of acrylic and methacrylic acids and 1 to 20 mol percent of a hydroxyalkyl acrylate, and 20 to 40 perecnt by weight of the siloxane wherein R is selected from the group consisting of the methyl, ethyl, vinyl, phenyl and 3,3,3-trifluoropropyl radicals, said siloxane containing at least 0.5 percent by weight of silicon bonded hydroxyl and/or alkoxyl groups.

4. An aqueous emulsion of the copolymer as defined in claim 1.

5. An aqueous emulsion of the copolymer as defined in claim 2.

6. An aqueous emulsion of the copolymer as defined in claim 3.

7. An article of manufacture which is a construction material having a coating theron containing a copolymer as defined in claim 1.

8. An article of manufacture which is a construction material having a coating theron containing a copolymer as defined in claim 2.

9. An article of manufacture which is a construction material having a coating theron containing a copolymer as defined in claim 3.

10. A latex paint composition containing a pigment dispersion and an emulsion of the copolymer as defined in claim 1.

11. A latex paint composition containing a pigment dispersion and an emulsion of the copolymer as defined in claim 2.

12. A latex paint composition containing a pigment dispersion and an emulsion of the copolymer as defined in claim 3.

References Cited

UNITED STATES PATENTS

| | | | |
|---|---|---|---|
| 3,317,629 | 5/1967 | Quaal | 260—827 |
| 2,877,207 | 3/1959 | Cox et al. | 260—827X |
| 2,803,615 | 8/1957 | Ahlrecht et al. | 260—29.6 |
| 3,449,293 | 6/1969 | Burzynski et al. | 260—827X |

MURRAY TILLMAN, Primary Examiner

H. ROBERTS, Assistant Examiner

U.S. Cl. X.R.

117—135.1, 138.8, 143, 148, 155, 161; 260—41, 46.5, 827